May 4, 1948.    J. F. LEVENTHAL    2,440,776
MOTION PICTURE APPARATUS OF THE OPTICAL COMPENSATING TYPE
Filed March 22, 1946    5 Sheets-Sheet 1
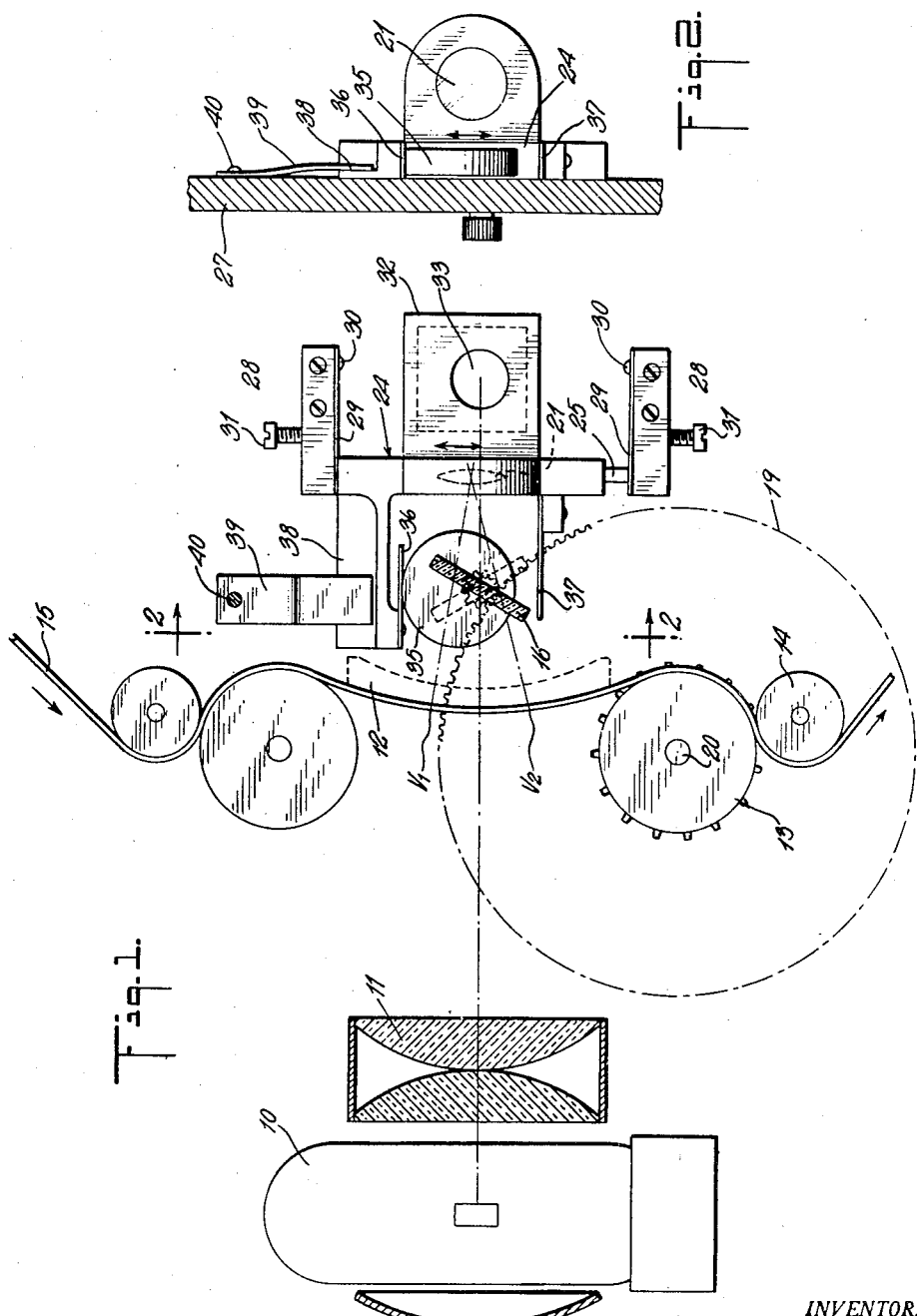
INVENTOR.
Jacob F. Leventhal
BY
Kenyon & Kenyon
ATTORNEYS May 4, 1948. J. F. LEVENTHAL 2,440,776
MOTION PICTURE APPARATUS OF THE OPTICAL COMPENSATING TYPE
Filed March 22, 1946 5 Sheets-Sheet 2
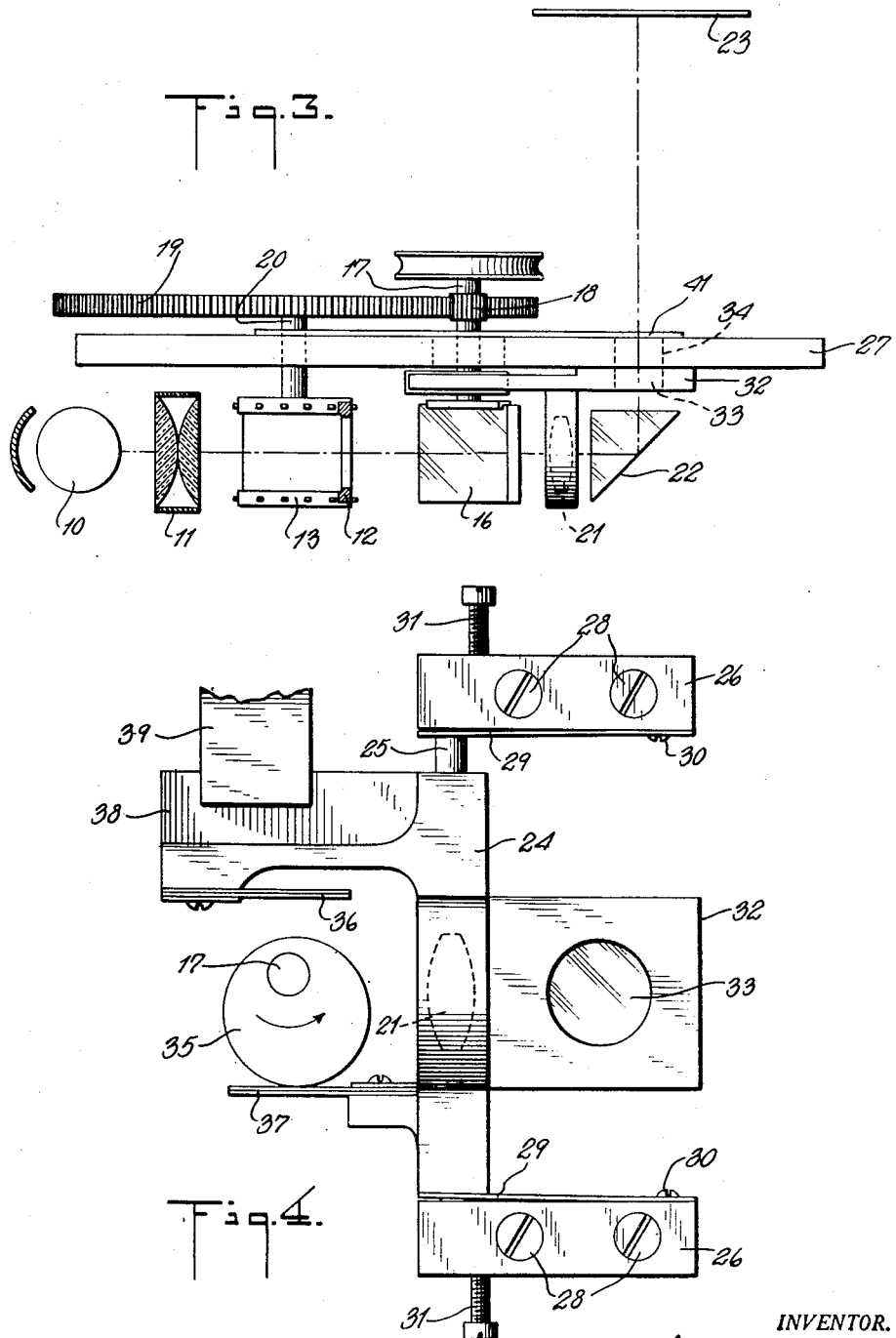
INVENTOR.
Jacob F. Leventhal
BY Kenyon & Kenyon
ATTORNEYS May 4, 1948. J. F. LEVENTHAL 2,440,776
MOTION PICTURE APPARATUS OF THE OPTICAL COMPENSATING TYPE
Filed March 22, 1946 5 Sheets-Sheet 3
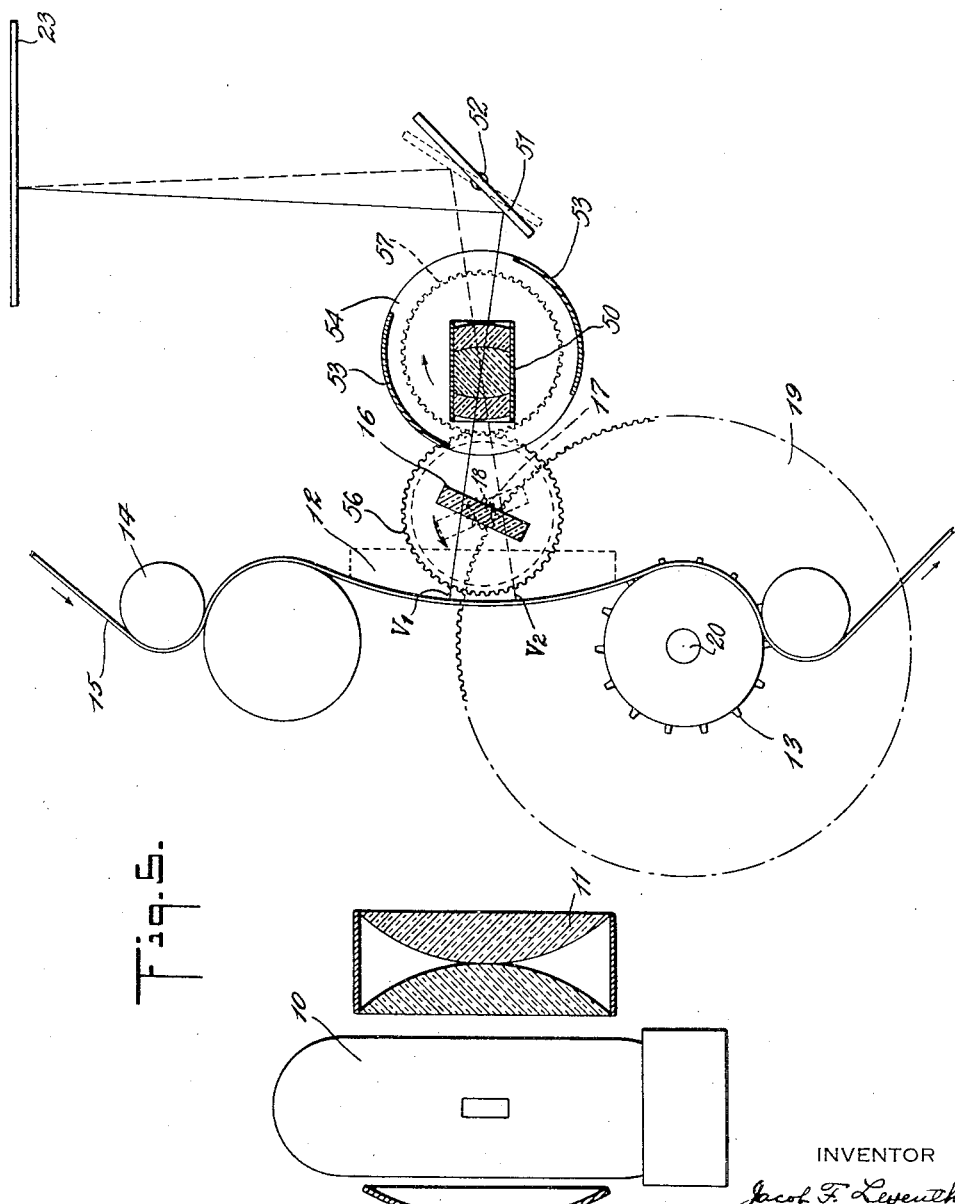
INVENTOR
Jacob F. Leventhal
BY Kenyon & Kenyon
ATTORNEYS May 4, 1948.  J. F. LEVENTHAL  2,440,776
MOTION PICTURE APPARATUS OF THE OPTICAL COMPENSATING TYPE
Filed March 22, 1946   5 Sheets-Sheet 4

INVENTOR
Jacob F. Leventhal
BY Kenyon & Kenyon
ATTORNEYS

May 4, 1948.  J. F. LEVENTHAL  2,440,776
MOTION PICTURE APPARATUS OF THE OPTICAL COMPENSATING TYPE
Filed March 22, 1946  5 Sheets-Sheet 5
Fig.9.
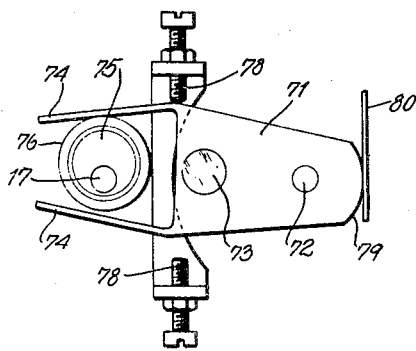
Fig.10.
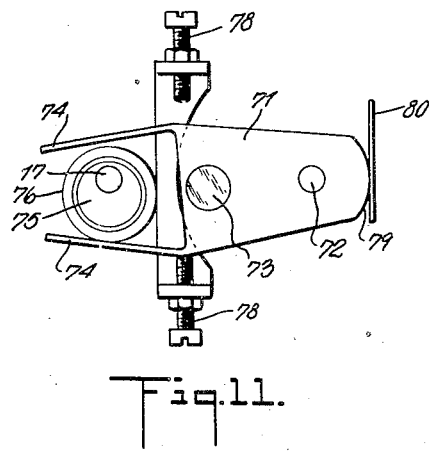
Fig.11.
INVENTOR.
Jacob F. Leventhal
BY
Kenyon & Kenyon
ATTORNEYS Patented May 4, 1948

2,440,776

UNITED STATES PATENT OFFICE 2,440,776

MOTION-PICTURE APPARATUS OF THE OPTICAL COMPENSATING TYPE

Jacob F. Leventhal, New York, N. Y., assignor to Leventhal Patents, Inc., Chattanooga, Tenn., a corporation of Delaware Application March 22, 1946, Serial No. 656,196

24 Claims. (Cl. 88—16.8)

This invention relates to motion picture apparatus and more especially to projectors in which the film moves uninterruptedly across the optical axis and the screen images are rendered stationary by optical compensation.

As illustrated in Leventhal Patent No. 2,067,771, the optical compensator may consist of a single plane-parallel plate of glass which is rotated between the film and lens in timed relation with the linear movement of the film. The plate may have such thickness and refractive index that a complete rotation of the plate during a picture cycle will produce of a single picture frame crossing the optical axis two successive stationary spaced virtual images separated in time from each other by periods of undesired effect which must be shuttered off. A plurality of thicker plane-parallel plates may be used to the same effect as shown in Leventhal Patents Nos. 1,974,573 and 2,085,594.

Since two spaced virtual images are produced, which are re-imaged at a screen plane, means must be provided for bringing the real images into register at the screen plane. In the devices illustrated in Leventhal Patents No. 1,974,573 and 2,067,771, registration of the real images is effected by the use of two objective lenses which are alternately covered and uncovered in timed relation with the production of the spaced virtual images so that the correct lens may be used for each image. A severe practical limitation resides in the fact that since the diameter of a lens is normally considerably greater than the spacing between the virtual images, only a partial lens may be used during each stage and this results in a material reduction in illumination.

In the device illustrated in Leventhal Patent No. 2,085,594, registration of the real images is effected by the use of a single lens and two reflectors interceptive of the light beam from the lens, each reflector when active being placed at such angle as to direct the axis of the picture to its proper point of registration at the screen plane. The arrangement shown in such patent has two different kinds of disadvantage. First, if the two mirrors are stationary, each can transmit only half the available light from the lens since both are in the beam and one must be shuttered off while the other is effective. Second, if one mirror is made rotatable so as to intercept the whole beam, a difficult mechanical problem presents itself with respect to the rotation of the mirror. While it is not impossible to insure that the reflector will revolve in its true plane without deviation, it is nearly so from a practical standpoint.

The patent to Leventhal, No. 2,255,892, discloses a projector of the character above described equipped with a single reflector which transmits all the useful light to the screen and is movable between two rest positions in both of which it co-operates with the objective lens to produce registering real images in a screen plane during the periods of light transmission to the screen. The reflector is actuated between its rest positions during periods of interruption of light transmission to the screen. The patent to Leventhal, No. 2,262,808, discloses a projector of the character previously described in which the objective lens is movable between two rest positions in both of which it produces registering real images in a screen plane during the periods of light transmission to the screen. The objective lens is actuated between its rest positions during periods of interruption of light transmission to the screen.

An object of this invention is to provide a projector of the character above described with improved mechanism for effecting actuation of either a movable objective lens or a movable reflector for effecting registration in a screen plane of the real images of the film pictures.

Other objects, novel features and advantages of this invention will become apparent from the following specification and accompanying drawings, wherein:

Fig. 1 is a diagrammatic section in the direction of film travel of a projector embodying the invention in an adaptation for actuating a lens, the lens being in one rest position;

Fig. 2 is a fragmentary section substantially on the line 2—2 of Fig. 1;

Fig. 3 is a diagrammatic section of the apparatus of Fig. 1 at right angles to the direction of film travel;

Fig. 4 is a fragmentary view generally similar to Fig. 1, but on a larger scale, the lens being in its other rest position;

Fig. 5 is a diagrammatic section in the direction of film travel of a projector embodying the invention in an adaptation for actuating a reflector;

Fig. 9 is a plan view of a projector embodying the invention in a modified adaptation for actuating a lens;

Fig. 10 is a section on the line 10—10 of Fig. 9 with the lens in one rest position, and Fig. 11 is a view similar to Fig. 10 with the lens in its other rest position.

Figure 6:
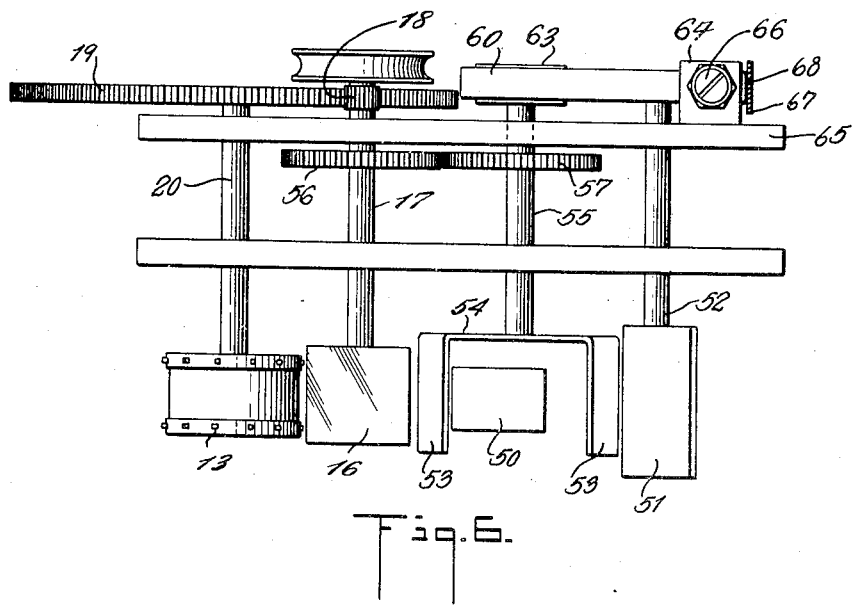
Fig. 6 is a plan view of such apparatus.

In Figs. 1 to 4 inclusive, 10 is a source of light and 11 is a condenser lens associated therewith to direct light from the source 10 through the film gate 12. A sprocket 13 co-operates with a retaining roller 14 to draw a film 15 across the gate 12. An optical compensator 16 is rotatably mounted just beyond the film gate in position to intercept the light beam passing from the lens 11 through the film gate. The compensator 16 is mounted on a shaft 17 to which is attached a pinion 18 meshing with a gear 19 fixed to the shaft 20 by which the sprocket wheel 13 is supported, (Fig. 3). The pinion 18 and the gear 19 are in such ratio that a single picture frame crosses the optical axis of the projector for each complete revolution of the compensator 16, thereby forming two successive stationary spaced virtual images $V_1$ and $V_2$ separated in time from each other as disclosed in Leventhal Patent No. 2,067,771.

An objective lens 21 is provided for producing real images of the virtual images $V_1$ and $V_2$ and a reflecting prism 22 (Fig. 3) is provided for directing the axis of the light beam passing through the lens 21 parallel to the shaft 17 to a screen 23, thereby making it possible to mount an obturator, later to be described, on the shaft 17 for periodically interrupting the light beam. (For simplification of the drawings, the prism 22 is omitted from Figs. 1, 2 and 4.)

The lens 21 is supported by a carrier 24 slidably mounted on a rod 25 supported by cleats 26 attached to a plate 27 by bolts 28. Each cleat 26 has attached thereto a flexible metal strip 29 by a bolt 30 passing through one end of the strip and at its other end the strip has an aperture through which the rod 25 extends. Also, each cleat 26 supports a screw 31, one end of which is engageable with the free end of a strip 29 to adjust the same relative to the cleat to regulate the extent of permissible travel of the carrier 24.

The supporting arrangement for the carrier 24 is such that the lens 21 is capable of reciprocation perpendicular to its axis and parallel to the direction of film travel between the rest position of Fig. 1 and the rest position of Fig. 4. The carrier 24 may be provided with an extension 32 extending between the prism 22 and the plate 27. In the extension 32 there may be provided an aperture 33 optically concentric with the lens 21 and of no greater diameter than the lens. The plate 27 may be provided with a slot 34 of proper shape and size to permit projection of the light beam from the prism 22 to the screen 23 irrespective of the position of the lens 21.

An eccentric 35 is fixed to the shaft 27 and the carrier 24 supports two resilient members 36 and 37 in position for selective engagement by the eccentric 35, each of said members being attached to the carrier 24 at one end only with the remaining end being free to flex slightly. The members 36 and 37 extend in opposite directions from the carrier perpendicular to its direction of reciprocation and are spaced apart a distance greater than the diameter of the eccentric 35. The carrier 24 is provided with a flat surface 38 which is engaged by one end of a strip 39 of resilient material attached at its remaining end to the plate 27 by a bolt 40. The member 39 tends to retain the carrier 24 at rest by reason of the friction exerted by the member 39 on the surface 38.

In the operation of the projector, the shaft 17 is rotated counterclockwise at constant speed by any suitable means, thereby causing one complete revolution of the compensator 16 during passage of one film picture across the optical axis of the projector, with resultant production of the virtual images $V_1$ and $V_2$. During periods of each half revolution of the compensator 16, undesirable effects accompany the production of the virtual image. During such periods, the beam of light issuing from the prism 22 is interrupted by an obturator 41 supported by the shaft 17 for rotation therewith and properly shaped to overlie the slot 34 during such periods. The obturator permits passage of the light beam to the screen during rotation of the compensator 16 from the position shown in Fig. 1 in full lines to the position shown in the same figure in dotted lines, this being the extent of compensator rotation during which undesirable effects do not accompany the production of the virtual images. The arrangement of the eccentric 35 on the shaft 17 and the spacing of the strips 36 and 37 is such that during rotation of the compensator 16 from its full line to its dotted line position of Fig. 1, the carrier 24 is either in the rest position shown in Fig. 1 or in the rest position shown in Fig. 4 and is moved from one position to the other during a period in which the obturator 41 is effective to close the slot 34.

With the carrier 24 in the position shown in Fig. 1, the lens 21, in combination with the prism 22 is effective to produce a real image on the screen 23 of the virtual image $V_1$ which is produced by rotation of the compensator 16 from its full line position to its dotted line position. During such rotation of the compensator 16, rotation of the eccentric 35 disengages its periphery from the strip 36 and the carrier 24 is retained in its Fig. 1 position by the friction member 39. Continued rotation of the eccentric 35 brings its periphery into engagement with the strip 37 during a period of closure of the slot 34 by the obturator 41 and consequent movement of the carrier 24 from its Fig. 1 position to its Fig. 4 position, which is reached by the time that the obturator again reaches its full line position in Fig. 1. The carrier remains in its Fig. 4 position by reason again of the friction exerted by the member 39 on the surface 38 until the eccentric periphery engages the strip 36 to return the carrier to its Fig. 1 position. While the carrier is in its Fig. 4 position, the lens 21 and prism 22 produce a real image on the screen 23 of the virtual image $V_2$ produced by rotation of the compensator 16 a second time during one complete revolution from its full line to its dotted line position of Fig. 1, the obturator 41 again being in position to permit passage of the light beam through the slot 34. The rest positions of the lens are such that lines from the center points of the virtual images $V_1$ and $V_2$ passing through the lens center in its two rest positions meet in a common point in the screen plane, thereby effecting registration on the screen 23 of the real images produced by the lens 21 of the virtual images.

Preferably, the arrangement is such that the carrier 24 reaches each position of rest before eccentric 35 reaches its position of maximum displacement, thereby causing slight flexion of either strip 36 or 37 after the carrier has reached a position of rest, thereby assuring that the carrier always will be moved the required distance to place the lens 21 in proper position to effect registration of the real images on the screen 23. Also, upon engagement of the eccentric 35 with either of the strips 36 or 37, such strip yields slightly, thereby reducing to a minimum the noise resulting from reciprocation of the carrier. The length of the path of reciprocation of the carrier 24 may be varied by adjustment of one or both of the stops 29 which limit the extent of movement of the carrier. Registration of the real images in the screen plane is controlled by proper location of the rest positions of the lens 21 which is regulated by adjustment of the stops 29. While two adjustable stops have been shown, only one need be adjustable and the other may be fixed.

Figures 7, 8:
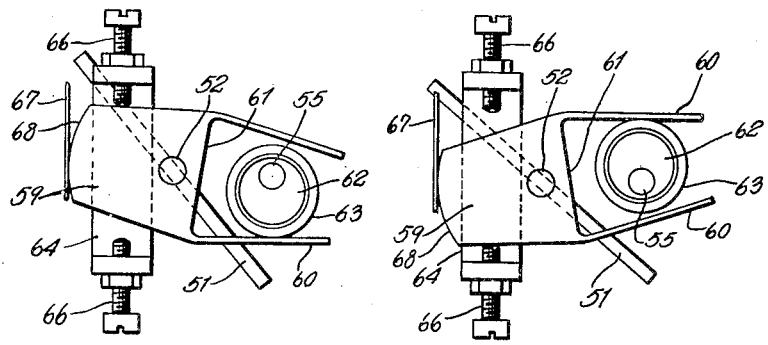
Fig. 7 is a rear elevation of a portion of such apparatus with the reflector in one rest position.
Fig. 8 is a view similar to Fig. 3 with the reflector in its other rest position.

In Figs. 5 to 8 inclusive, 10 is the light source and 11 is the condenser lens to direct light from the source 10 through the film gate 12. The sprocket 13 co-operates with the retaining roller 14 to draw the film 15 across the gate 12. The optical compensator 16 is rotatably mounted just beyond the film gate on the shaft 17 to which is attached the pinion 18. The gear 19 is fixed to the shaft 20 carrying the sprocket wheel 13 and meshes with the pinion 18. The gear 19 and pinion 18 are in proper ratio that a single picture frame crosses the optical axis of the projector for each complete revolution of the compensator 16, thereby forming two successive spaced virtual images $V_1$ and $V_2$.

A stationary objective lens 50 is provided for producing real images of such virtual images and a mirror 51 is provided for effecting registry of such real images in the screen plane 23. The mirror 51 is oscillated between two positions in one of which it redirects light for reproducing a real image of one of the virtual images and in the other of which it redirects light for reproducing a real image of the remaining virtual image. The reflector 51 is rigidly fastened to a shaft 52 preferably, though not necessarily, arranged in the front focal plane of the objective lens 50. Means, later to be described, are provided for effecting oscillation of the mirror 51 between the two positions above mentioned.

An obturator is provided for interrupting the light beam twice for each complete revolution of the compensator 16. This obturator consists of a pair of coaxial diametrically opposed arcuate shields 53 projecting from one face of a plate 54 supported by a rotatable shaft 55 parallel to the shaft 52. The shields 53 are rotatable around the objective lens 50 to pass alternately between the compensator 16 and the lens 50 to interrupt the flow of light from the lens 50 at such times as the compensator 16 is in positions in which the production of virtual images is accompanied by undesirable effects. Rotation of the obturator is effected through the medium of a gear 56 on the shaft 17 and a gear 57 on the shaft 55, these gears having a one-to-one ratio.

A lever 59 is fixed to the shaft 52 and at one end is provided with a pair of arms 60 converging outwardly to form a notch 61. The shaft 55 eccentrically supports the inner race member 62 of a ball bearing having its outer race member 63 adapted to engage the arms 60 with clearance between one arm and the outer race member when the other arm engages the outer race member. A bracket 64 attached to the plate 65 supports a pair of adjustable screws 66 arranged for engagement by the lever 59 to limit the extent of its oscillation. Rotation of the shaft 52 effects movement of the periphery of the race member 63 toward and away from the arms 60 along a line perpendicular to a line joining the axes of the shafts 52 and 55, thereby causing oscillation of the lever 59 between the two positions shown in Figs. 7 and 8 by engagement of the outer race 73 with the arms 60 to oscillate the mirror 51. The stops 36 are so arranged that the permissible extent of oscillation of the lever 59 and mirror 51 is slightly less than the maximum extent of oscillation which the race 63 is capable of producing and the arms 60 are sufficiently resilient to flex enough to permit full rotation of the shaft 55 without injury to any of the parts. The width of the notch is somewhat greater than the outer diameter of the race member 63 so that the lever 59 has two stationary periods for each complete rotation of the shaft 55. Also, the convergence of the arms 60 is such that a half revolution of the shaft 55 is required for effecting movement of the lever 59 in either direction between its two extreme positions.

In the operation of the projector, the shaft 17 is driven at constant speed by any suitable means, thereby causing one complete rotation of the compensator 16 during the passage of one film picture across the optical axis of the projector and one complete rotation of the obturator to interrupt the light beam twice for each complete rotation of the compensator 16. Each half revolution of the shaft 55 causes movement of the lever 59 in one of its directions into engagement with one of the stops 36 and some additional movement of an arm 60 with the shaft 52 remaining stationary during such additional movement and until the outer race member 63 moves away from said arm and into engagement with the other arm. The mirror 51 likewise remains stationary with the shaft 52. The clearance between the ball race 63 and the arms 60 is such that the mirror 51 remains stationary except during a period that the obturator is in position to interrupt the light beam.

The extent of desired movement of the reflector 51 depends upon the focal length of the objective lens 50 which under normal manufacturing conditions may vary between ±2%. Adjustment of the extent of oscillation of the mirror 51 to obtain the proper oscillation for a particular lens 50 is effected by adjustment of either screw 36 during operation of the projector. Movement of one screw away from the other increases the extent of oscillation of the mirror 51 while movement of one screw toward the other decreases the amount of oscillation of the mirror 51. Proper adjustment of the mirror is determined by observation of the screen images.

The timing is such that the mirror is moved from one position to the other during the time that the obturator is intercepting the light beam and any vibration that may develop in the mirror is dissipated before the obturator has ceased to act. The mirror is completely detached from its driving mechanism during the period of picture projection, so that during this period it is absolutely stationary.

The lever 59 is provided with an arcuate surface 67 concentric with the shaft 52 and a leaf spring 68 bears against the surface 67. The spring 68 frictionally opposes the oscillation of the lever 59 and operates to maintain the lever at rest when the race member 63 is out of contact with the arms 60.

The embodiment of Figs. 9 to 11 is provided with the same arrangement of elements designated by reference numerals 10 to 20 described in connection with the prior embodiments. A reflecting prism 70 is arranged to intercept the optical axis of the condenser lens 11 and is so placed that a beam of light directed to it is reflected parallel to the compensator axis to the screen plane 23. A lever 71 is supported at one end by a pivot pin 72 and is provided with an objective lens 73 for producing real images of the virtual images V1 and V2 produced by the compensator 16 as previously described. The lever 71 is provided at its opposite end with a recess defined by thin straight sides 74 which converge slightly.

The shaft 17 eccentrically supports the inner race member 75 of a ball bearing having its outer race member 76 adapted selectively to engage the prongs 74 with clearance between the inner surface of one prong and the outer race member when the inner surface of the other prong engages the outer race member. Rotation of the shaft 17 effects movement of the pheriphery of the race member 76 toward and away from a prong surface along a line perpendicular to a line joining the axes of the shaft 17 and 72 thereby causing oscillation of the lever 71 between the two rest positions shown in Figs. 10 and 11 by engagement of the outer race member 76 with the surfaces of the prongs 44 to move the lens 73 between two extreme positions. The space between the prongs 74 is of greater width than the diameter of the race member 76 so that the lever 71 has two stationary periods for each complete revolution of the shaft 17. Also, the convergence of the prongs 74 is such that a half revolution of the shaft 17 is required for effecting movement of the lever 71 in either direction between its two rest positions.

An obturator 77 is supported by the shaft 17 for rotation in unison therewith. The obturator is of such design as to interrupt the flow of light from the prism 70 at such time as the compensator 16 is in positions not suitable for the production of stationary virtual images of the film pictures.

Adjustable stops 78 are provided for limiting the extent of oscillation of the lever 71. A curved surface 79 is provided on the lever 71 concentric with the shaft 72 and a resilient member 80 bears against the surface 79 to provide friction for maintaining the lever 71 at rest when the periphery of the race member 76 is out of contact with the arms 74.

During the first compensating stage, the lens 73 is in the position shown in Fig. 10 and in such position acts to re-image the virtual image V1 in the screen plane and the lens is maintained in this position during the first period for which the shutter 77 is non-interceptive of the beam of light. During the first period for which the shutter 47 is interceptive of the beam of light, the lens 73 is moved into the position shown in Fig. 11, in which position it is properly arranged to re-image the virtual image V2. The lens is retained in this position during the second period for which the shutter is non-interceptive of the light beam and during the next period in which the shutter is interceptive of the light beam the lens 73 is returned to the position shown in Fig. 9, after which the cycle is repeated. With the arrangement above described, real images are produced on the screen in registering relation and all the available light from the light source is utilized in the production of each real image.

I claim:

1. A device of the character described comprising means for feeding motion picture film at uniform linear speed, a movable optical compensator, means to effect during movement of the film through a single picture cycle movement of the compensator through two compensating cycles to produce two successive stationary spaced virtual images of a luminous point on the film, optical means to reimage said virtual images in registering relation and including an optical unit movable between two positions, a carrier for said unit, a pair of resilient elements attached to said carrier and arranged with a gap therebetween, a member movable to and fro in said gap for lost-motion engagement with said resilient elements to effect movement of said carrier, and means to effect movement of said member in timed relation to the movement of said compensator.

2. A device according to claim 1 characterized by friction means opposing movement of said unit.

3. A device of the character described comprising means for feeding motion picture film at uniform linear speed, a movable optical compensator, means to effect during movement of the film through a single picture cycle movement of the compensator through two compensating cycles to produce two successive stationary spaced virtual images of a luminous point on the film, optical means to reimage said virtual images in registering relation and including an optical unit movable between two positions, a carrier for said unit, a pair of resilient elements attached to said carrier and arranged with a gap therebetween, an eccentric of less diameter than the distance between said elements rotatably mounted in said gap for engagement of its periphery with said elements, and means to rotate said eccentric in timed relation to the movement of said compensator.

4. A device according to claim 3 characterized by means for retaining the carrier stationary during the periods when force is not applied thereto from the eccentric.

5. A device of the character described comprising means for positively feeding motion picture film at uniform linear speed, a movable optical compensator, means to effect during movement of the film through a single picture cycle movement of the compensator through two compensating cycles to produce two successive stationary spaced virtual images of a luminous point on the film, optical means to reimage said virtual images in registering relation and including an optical unit movable between two positions, a carrier for said unit, an eccentric rotated in timed relation to the movement of said compensator, means interconnecting said carrier and eccentric for effecting movement of said unit by said eccentric from its first position to its second position during the initial part only of a first half revolution of said eccentric and from its second position to its first position during the initial part only of a second half revolution of said eccentric, and friction means opposing movement of said carrier.

6. A device according to claim 5 characterized by said optical unit being a lens.

7. A device according to claim 1 characterized by said optical unit being a lens.

8. A device according to claim 1 characterized by said optical unit being a reflector.

9. A device of the character described comprising means for feeding motion picture film at uniform linear speed, a rotatable optical compensator, means to effect during movement of the film through a single picture cycle rotation of the compensator through two compensating cycles to produce two successive stationary spaced virtual images of a luminous point on the film, a lens movable between two positions to re-image said virtual images in registering relation, a carrier supporting said lens for rectilinear reciprocation, a pair of resilient elements attached to said carrier and arranged with a gap therebetween, a member movable to and fro in said gap for lost-motion engagement with said resilient elements to effect reciprocation of said carrier, and means to effect movement of said member in timed relation to the rotation of said compensator.

10. A device according to claim 9 characterized by friction means opposing reciprocation of said carrier.

11. A device of the character described comprising means for feeding motion picture film at uniform linear speed, a rotatable optical compensator, means to effect during movement of the film through a single picture cycle rotation of the compensator through two compensating cycles to produce two successive stationary spaced virtual images of a luminous point on the film, a lens movable between two positions to re-image said virtual images in registering relation, a carrier supporting said lens for rectilinear reciprocation, a pair of resilient elements attached to said carrier and arranged with a gap therebetween, an eccentric of less diameter than the distance between said elements rotatably mounted in said gap for engagement of its periphery with said elements, and means to rotate said eccentric in timed relation to said compensator.

12. A device of the character described comprising means for feeding motion picture film at uniform linear speed, a rotatable optical compensator, means to effect during movement of the film through a single picture cycle rotation of the compensator through two compensating cycles to produce two successive stationary spaced virtual images of a luminous point on the film, a lens movable between two positions to re-image said virtual images in registering relation, a carrier supporting said lens for rectilinear reciprocation, a pair of resilient elements attached to said carrier and arranged with a gap therebetween, and means interconnecting said carrier and eccentric for effecting reciprocation of said lens from its first position to its second position during the initial part only of a first half revolution of said eccentric and from its second position to its first position during the initial part only of a second half revolution of said eccentric.

13. A device of the character described comprising means for feeding motion picture film at uniform linear speed, a rotatable optical compensator, means to effect during movement of the film through a single picture cycle rotation of the compensator through two compensating cycles to produce two successive stationary spaced virtual images of a luminous point on the film, an oscillatable carrier, a lens supported by said carrier for movement between two positions to re-image said virtual images in registering relation, a pair of resilient elements attached to said carrier and arranged with the gap therebetween, a member movable to and fro in said gap for lost-motion engagement with said resilient elements to effect oscillation of said carrier, and means to effect movement of said member in timed relation to the rotation of said compensator.

14. A device of the character described comprising means for feeding motion picture film at uniform linear speed, a rotatable optical compensator, means to effect during movement of the film through a single picture cycle rotation of the compensator through two compensating cycles to produce two successive stationary spaced virtual images of a luminous point on the film, a lens for producing real images of said virtual images, a reflector interceptive of light from said lens and movable between two positions, a pair of resilient elements attached to said reflector and arranged with a gap therebetween, a member movable to and fro in said gap for lost-motion engagement with said resilient elements to effect oscillation of said reflector, and means to effect movement of said member in timed relation to the rotation of said compensator.

15. A device according to claim 11 characterized by friction means opposing movement of said carrier.

16. A device according to claim 13 characterized by friction means opposing movement of said carrier.

17. A device according to claim 5 characterized by said optical unit being a reflector.

18. A device according to claim 14 characterized by friction means opposing movement of said reflector.

19. A device according to claim 1 characterized by means for limiting the extent of movement of said optical unit.

20. A device according to claim 3 characterized by means for limiting the extent of movement of said optical unit.

21. A device according to claim 5 characterized by means for limiting the extent of movement of said optical unit.

22. A device according to claim 11 characterized by means for limiting the extent of movement of said lens.

23. A device according to claim 13 characterized by means for limiting the extent of oscillation of said lens.

24. A device according to claim 14 characterized by means for limiting the extent of movement of said reflector.

JACOB F. LEVENTHAL.

REFERENCES CITED

The following references are of record in the file of this patent:

UNITED STATES PATENTS

| Number | Name | Date |
| --- | --- | --- |
| 2,255,892 | Leventhal | Sept. 16, 1941 |
| 2,262,808 | Leventhal | Nov. 18, 1941 |